E. H. LYSLE.
OPTICAL APPARATUS.
APPLICATION FILED APR. 25, 1916.

1,367,488.

Patented Feb. 1, 1921.
7 SHEETS—SHEET 1.

Attest:

Inventor:

E. H. LYSLE.
OPTICAL APPARATUS.
APPLICATION FILED APR. 25, 1916.

1,367,488.

Patented Feb. 1, 1921.
7 SHEETS—SHEET 3.

Attest:

Inventor:

E. H. LYSLE.
OPTICAL APPARATUS.
APPLICATION FILED APR. 25, 1916.

1,367,488.

Patented Feb. 1, 1921.
7 SHEETS—SHEET 4.

E. H. LYSLE.
OPTICAL APPARATUS.
APPLICATION FILED APR. 25, 1916.

1,367,488.

Patented Feb. 1, 1921.
7 SHEETS—SHEET 7.

Attest:
H. W. Hayner
J. B. Cannock

Inventor:
Edmond H. Lysle

UNITED STATES PATENT OFFICE.

EDMOND H. LYSLE, OF NEW YORK, N. Y.

OPTICAL APPARATUS.

1,367,488.  Specification of Letters Patent.  Patented Feb. 1, 1921.

Application filed April 25, 1916. Serial No. 93,366.

*To all whom it may concern:*

Be it known that I, EDMOND H. LYSLE, a citizen of the United States, and a resident of the city of New York, in the county of New York and State of New York, have invented certain new and useful Improvements in Optical Apparatus, of which the following is a complete, full, and exact disclosure.

My invention relates to optical apparatus, and more particularly to apparatus for recording continuously, the motions of an object in motion, without the use of the usual shutter which is intermittently opened and closed as is common in ordinary commercial cameras for taking what are known as moving pictures.

In the ordinary cameras usually used for making photographic records of an animated scene or object, a suitable sensitized photographic medium is given an intermittent motion through the field of illumination of the lens system of the camera and a shutter which is synchronized to operate in connection with the film or other medium is momentarily open while the film is stationary in the field of the lens system. When the shutter is closed, the film is rapidly shifted or progressed to bring the next successive portion therein into position for exposure and the film is then maintained stationary while the shutter is again opened and closed. In such apparatus, the time during which the shutter is closed is substantially as long, or longer, than the time during which the shutter is open and under these conditions, only one-half or even less than one-half of the phases or changes in motion or position of the object are recorded on the film. The photographic record so produced, therefore, constitutes at best only a partial record of all the motions of the object.

One of the main distinguishing features of this invention consists in the elimination of a shutter or of any shutter mechanism, the lens system being open at all times during the making of a photographic record or in projecting images upon a screen, the light being allowed to continuously pass through the lens system. Another distinguishing characteristic of this invention over the ordinary camera for recording objects in motion or for a projector of objects in motion, consists in the elimination of all mechanism for imparting to the film an intermittent motion. Instead of having an intermittent motion, the film is given a steady continuous motion, and, therefore, that portion of the film which is in the field of the illumination of the lens is continually and continuously in motion during the making of a photographic record thereon or during the projection of the record to a screen. It must be obvious from what has been previously stated, that in the apparatus of this application every motion, every change of motion and every phase of motion, which the object being photographed may have, are recorded upon the film or other photographic sensitive medium, and, conversely are projected on a screen when the device is used as a projector.

The objects of the present invention are to make a continuous photographic record of every motion or phase of motion of an object in motion upon a constantly moving photographic medium passing through the field of illumination of a fixed lens system, said lens system being continuously open.

A further object of this invention is to make such a photographic record upon a film or photographic medium, all of the illuminated portions being in a fixed plane while passing through the field of illumination of the lens. A further object of my invention is to make a photographic record upon a photographic medium constantly moving through the field of illumination of a continuously open lens system in which the successive impressions on the photographic medium or closely adjacent each other, that is to say, in which there is no extended un-utilized portions of the film between adjacent portions of the photographic record, each exposed portion being substantially square, with the squares disposed at an angle of substantially 45° to the length of the film and with the corners of adjacent exposed portions substantially touching. A further feature or object of the invention, is to produce a photographic record of an animated virtual image of the real object, and in which the plane of the film is normal or perpendicular to the plane in which is the real object being photographed.

A further object of this invention is to provide proper reflecting media and to so move them, and the film, that an optically stationary relationship is constantly maintained between the optical center of the lens system and that portion of the film which is in the field of illumination of the lens system.

The optical apparatus forming the subject-matter of this invention may be readily adapted or changed to provide a projector as distinguished from a camera by replacing the photographic film with a positive photographic record and causing a strong beam of light to pass through said photographic record and be reflected by the reflecting media of the apparatus out through the lens system to a suitable screen and in operating the apparatus as a projector, the record strip is similarly continuously moved, and the lens system is continuously open. When used as a projector, the virtual image of the picture which is on the film itself is that which is projected through the lens system. The said virtual image will appear to be upright with respect to the film itself, that is to say, the picture on the film is in the plane of the film while the virtual image which is projected is in a plane perpendicular thereto.

A further object of this invention is to avoid the disagreeable and often injurious effects upon the eye of the observer of projected records of an object in motion, due to the rapid throwing upon the screen of successive pictures which depend upon "persistence of vision" for their effect of producing pictorial representations of objects in motion.

A further object of my invention is to avoid the use of synchronizing mechanism as such, in the maintenance of the exposed portion of the moving film at a fixed and constant distance from the optical center of the lens, and to provide a structure in which the moving portions or parts thereof are all driven at the same linear rate of speed. By disposing the direction of the travel of the film and of the two sets of reflecting media at proper angles with respect to each other, and with respect to the axis of the lens system, so that the component of their movements in a direction away from the optical center of the lens is constant with the linear speed of each constant, the use of all synchronizing mechanisms, as such, is avoided.

Other objects of my invention will appear in the specification and claims below.

Referring now to the drawings forming a part of this application and in which the same reference characters are employed throughout the various views to designate the same parts, Figure 1 is a side elevation of the mechanism forming the subject-matter of this invention, the casing itself being shown in section.

Fig. 9 is a perspective view of a modified presser plate to adapt the mechanism for use as a projector.

Figure 1:
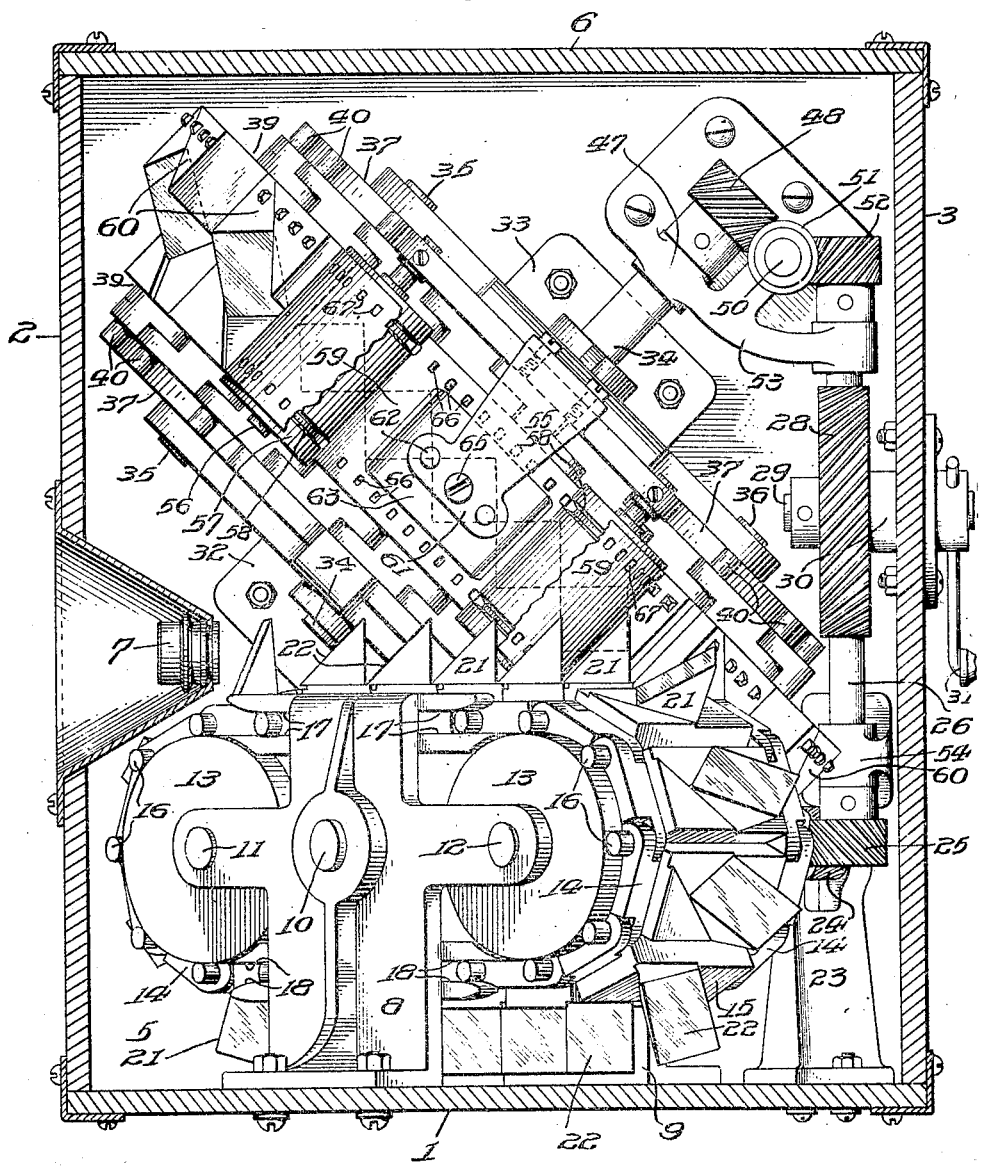

The casing within which the apparatus is inclosed comprises a bottom or base 1, a front side 2, a rear side wall 3, two lateral side walls 4 and 5 and a top 6.

Mounted in the front side 2 in any suitable manner is a lens 7 of any approved type.

Mounted upon the base 1 is a pair of complemental brackets 8, 9 within which is journaled a shaft 10 and parallel thereto, two shafts 11 and 12, said latter shafts being provided with idler pulleys 13 adapted to support and carry the lower chain of reflectors 14, said chain being composed of a plurality of link members 15 secured together by pivot pins 16 preferably extending through and beyond the sides of the link members 15 and forming a support for the chain about the idler pulleys 13. The link members 15 are preferably closely fitted between each pair of idlers 13 on a shaft and the ends of the pivot pins 16 rest upon the outer surface of the idlers 13.

Between the idler pulleys 13—13 on opposite shafts is provided an upper guideway 17 and a lower guide-way 18 between which the projecting ends of the pivot pins 16 smoothly fit and by means of which the chain 14 is maintained horizontally between the idler rollers 13 on the respective shafts 11 and 12.

Each of the link members 15 on its inner side is provided with rack teeth 19, preferably of the "skew" type and adapted to mesh and coöperate with a driving gear 20, rigidly mounted on the said shaft 10. The driving gear 20 is preferably substantially midway between the shafts 11 and 12 and engages the rack teeth 19 on the link members 15 on opposite sides of the gear so that the lower chain 14 is driven in its upper course and also in its lower course, the skew gearing between the driving gear on the rack affording a very smooth motion. Upon the outer surface of each link member is provided a reflector 21.

In the mechanism illustrated in the preferred embodiment of my invention as illustrated in the drawings, the lower chain 14 is mounted on horizontal shafts and the paths of the link members 15 and the reflectors 21 attached thereto in their travel between the idlers 13 is in a horizontal plane, the centers of the upper course of reflectors 21 lying in a horizontal plane coincident with the axis of the lens system 7. Moreover, the shafts 10, 11 and 12 are also arranged in vertical planes intersecting the axis of the lens system 7 at an angle of 45° so that a line drawn through the centers of reflecting surfaces 22 of the reflectors 21 in their upper course between the idlers 13 will intersect the axis of the lens 7 at angle of 45°.

Figure 3:
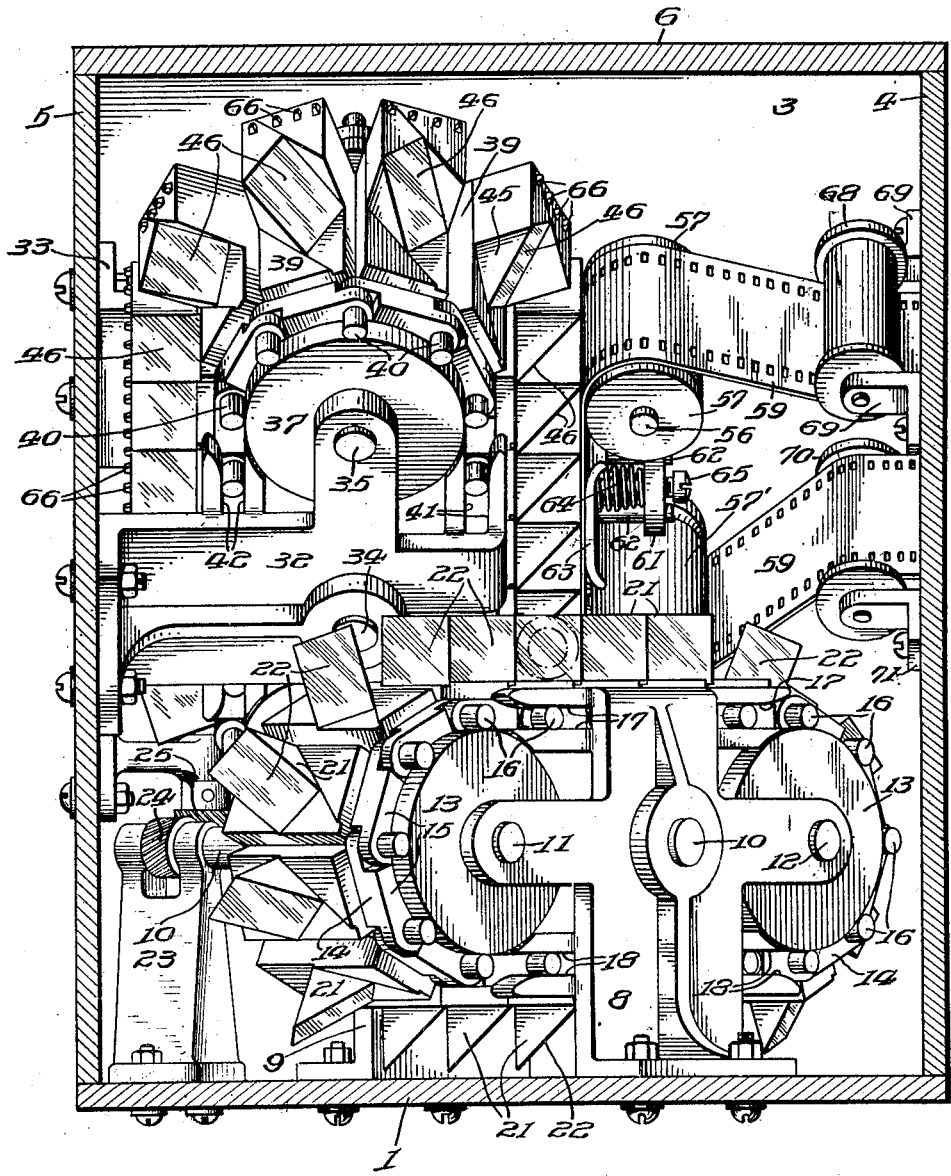
Fig. 3 is a similar front view, the casing also being shown in transverse section.
Figure 4:
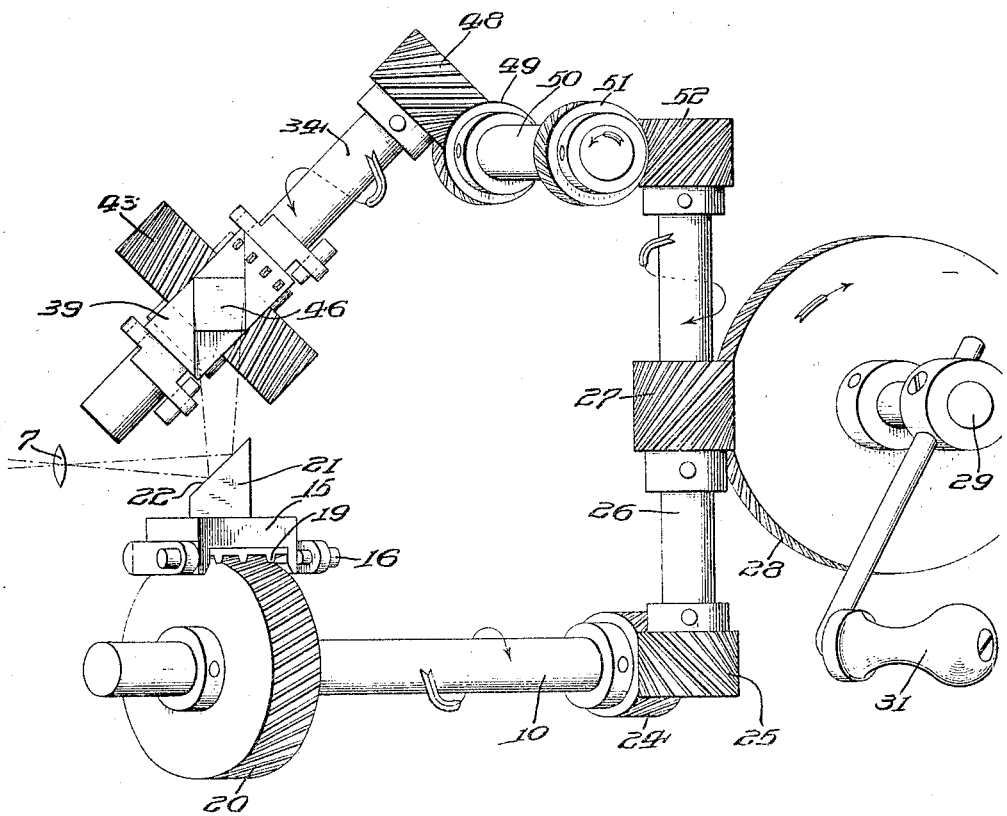
Fig. 4 is a view showing the driving mechanism for the system of reflectors.

Referring now particularly to Figs. 1, 3 and 4, the rear end of the shaft 10 projecting beyond the rear bracket 9, is preferably journaled in a bearing block 23 and is provided with a skew pinion 24 which meshes with a similar skew pinion 25 mounted on the vertical shaft 26 which is provided with another skew pinion 27 meshing with a driving gear 28, provided with skew teeth, mounted on a shaft 29 journaled in a bracket or bearing 30. This driving shaft 29 may be provided with a suitable crank or handle 31, by means of which motion may be imparted to the driving gear 20 through the train of gearing above set forth to cause the lower chain 14 to travel around the idler pulleys 13 and through their upper and lower course between said idlers 13.

Similarly mounted on coöperating and substantially complementary brackets 32, 33 on the vertical wall 5 of the casing is a shaft 34 and two parallel shafts 35 and 36 upon which are mounted the idlers 37. Around these idlers extend the upper chain, consisting of a plurality of link members 39 connected by pivot pins 40, the pivot pins extending or projecting beyond the lateral sides of each link member and serving as a support for the link members in their travel around the idlers 37, the said link members 39 closely fitting between each pair of idlers 37 on a shaft.

This arrangement is similar to the arrangement of the link members 15 of the lower chain 14, as previously described.

Figure 5:
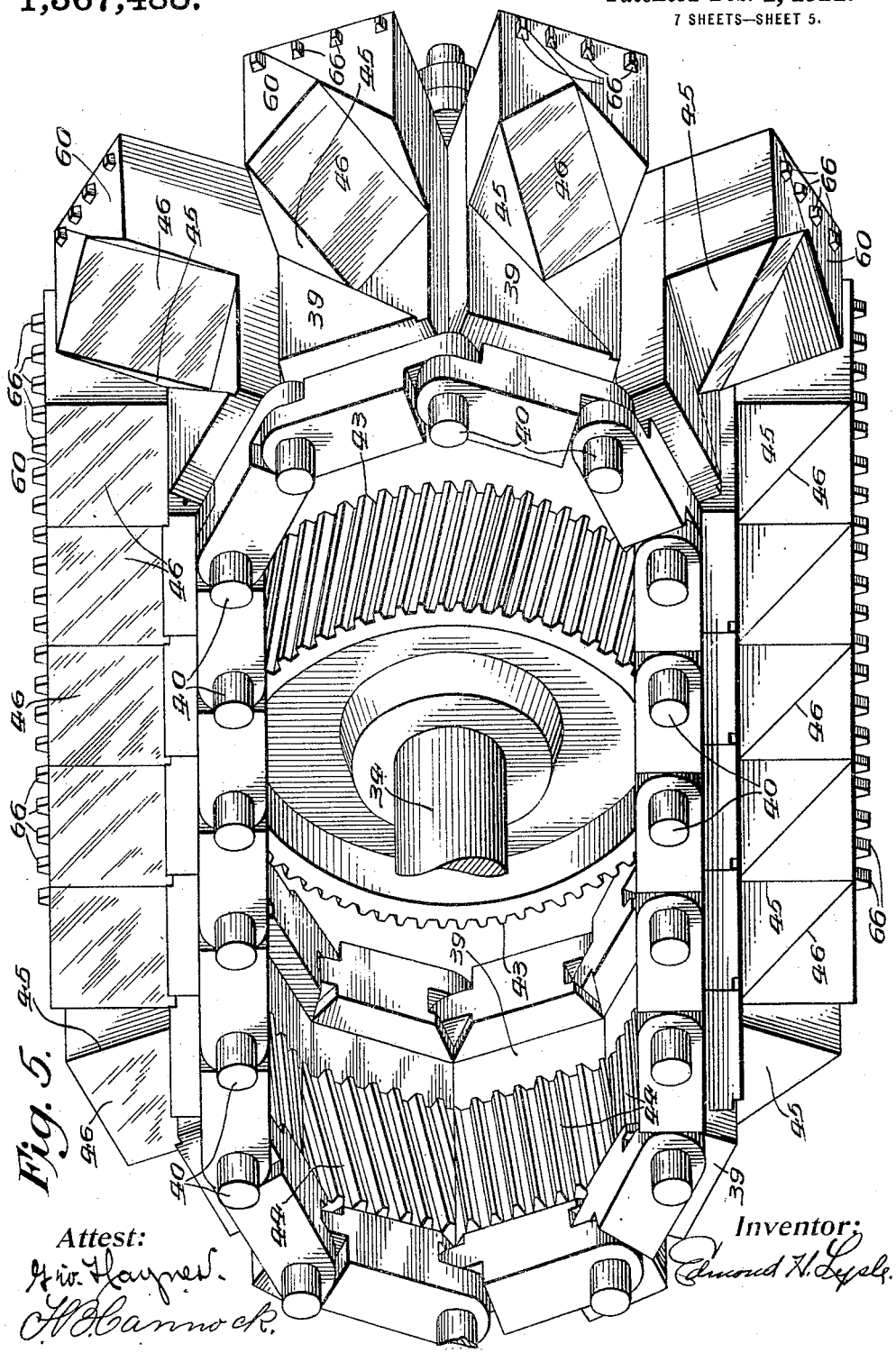
Fig. 5 is an enlarged view of the upper chain of reflectors as indicated in Fig. 3, showing the manner in which motion is imparted thereto by the drive wheel or gear.
Figure 6:
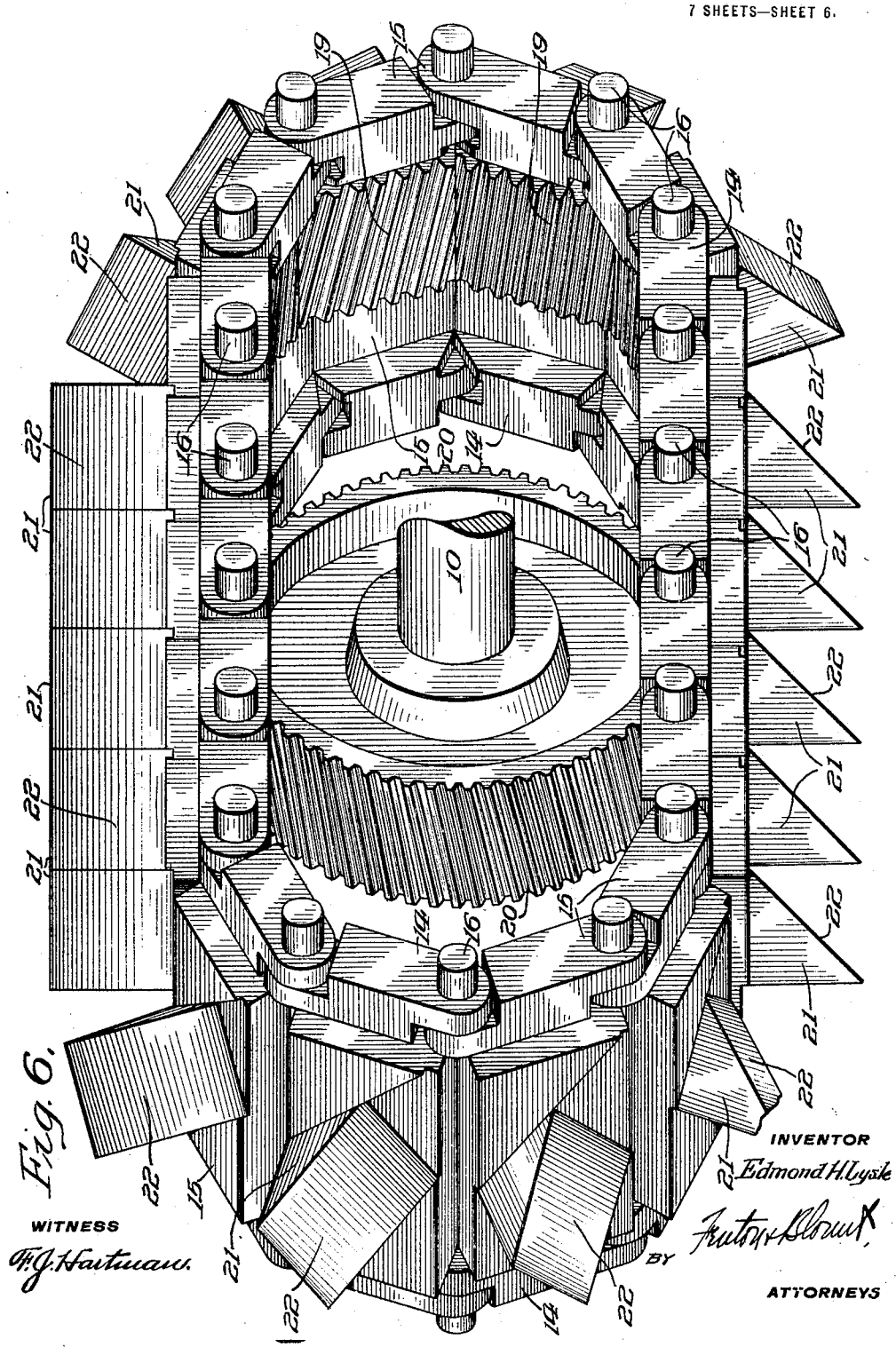
Fig. 6 is a similar view of the lower chain of reflectors as shown in Fig. 3.

Between said idlers 37 on the shafts 35 and 36 are provided guide-ways 41 and 42 between which the projecting ends of the pivot pins 40 closely fit to insure a parallel travel of the link members between the idlers and to form a support for the chain to hold it in position for engagement with a driving gear 43 (see Fig. 5) fixedly mounted on said shaft 34 and provided with skew teeth engaging the opposite sides of said gear 43 coöperating with rack teeth 44 on the inner side of each link member 39. Upon the outer side of each link member 39 is mounted a reflector 45 having a reflecting surface 46.

The outer end of the shaft 34 extending above the bracket 33 is preferably journaled in a block or bearing 47 and is provided with a skew gear 48 fixedly secured to said shaft 34 and meshing with a similar skew gear 49 fixedly secured to a horizontal shaft 50. Said shaft 50 is mounted in suitable bearings and is provided with a second skew gear 51 meshing with a corresponding skew gear 52 on the upper end of the vertical shaft 26. Thus, when the shaft 26 is revolved or rotated by the gear 28 motion will be imparted through the gearing above described to the driving gear 43 of the upper chain, and the upper chain will be caused to be driven around its idlers 37 and through its parallel course in opposite directions between said idlers. The shaft 34, the shaft 50 and the upper end of the shaft 26 may all be journaled in a suitable housing or bearing block 53, and the lower end of the shaft 26 may be similarly journaled in a bearing bracket 54 in any suitable manner to provide a disposition of the shafts 34, 50 and 26 with respect to each other in the manner indicated in Fig. 4.

The upper course of the reflectors 21 of the lower chain constitutes the active portion of their travel; that is to say, during this upper course of their travel their centers pass through the axis of the lens 7 at an angle of 45° and the righthand course of the reflectors 45 of the upper chain (looking from the front side 2 into the casing) constitutes the active portion of the travel of the said reflectors 45.

The reflectors 21 are so disposed with respect to the link members 35 and the axis of the lens 7 that when the center of a reflecting surface 22 is coincident with the axis of the lens 7, it reflects the light striking said reflecting surface through said lens vertically, or, more broadly stated, the reflecting surfaces 22 of the upper course of reflectors 21 while passing through the field of said lens are parallel to each other, are disposed at 45° to the horizontal, and reflect the light striking them in coming through said lens vertically.

The parallel shafts 34, 35 and 36 are also disposed in a vertical plane and their axes make an angle of 45° with a horizontal plane passing through the axis of the lens 7, and are so positioned that in the active portion of their travel the centers of the reflectors 45 of the upper chain are disposed in a vertical plane in which the axis of the lens 7 is also located.

The reflectors of the upper chain, therefore, during their active course of travel are in a vertical plane passing through the axis of the lens 7 moving downwardly in a path making an angle of 45° to a horizontal plane passing through the axis of the lens 7 and moving from the front side 2 of the axis wherein is mounted the lens 7, rearwardly.

With respect to the reflectors of the lower chain during the active portion of their travel, the centers of the reflectors move in a horizontal plane and intersect the axis of the lens system at an angle of 45° and move rearwardly from the front to the rear casing, that is to say, away from the lens 7. It will be seen that from the gearing illustrated in Fig. 4, the driving gears 20 and 43 within the lower and upper chains respectively are driven at the same rate of speed.

During their active course of travel, the reflecting surfaces 22 of the lower chain of reflectors lie in a plane disposed at right angles to a vertical plane passing through the axis of the lens 7 and disposed at an angle of 45° to a horizontal plane passing through the axis of the lens system.

The reflecting surfaces 46 of the upper chain of reflectors are disposed in a plane intersecting a vertical plane at right angles and intersecting a horizontal plane passing through the axis of the lens at an angle of 45°. Inasmuch as the chains are driven at the same rate of speed and the active course of the reflectors of the upper and lower chains make the same angle of 45° with the axis of the lens system 7, and inasmuch as the reflectors of both systems move at the same speed measured in a direction parallel to the axis of the lens system the forward and rear edges of the reflectors of the upper and lower chains of reflectors will be in the same vertical plane normal to the axis of the lens 7 during their active courses of travel.

The reflecting surfaces 22 of the lower course of reflectors are disposed so as to reflect the light entering the lens 7 vertically or at right angles thereto while passing through the field of illumination of the lens and the reflecting surfaces 46 of the upper chain of reflectors are so disposed as to reflect the light received by them while passing through the reflected field of illumination of the lens 7 horizontally at right angles to the right of the apparatus, (when looking from the front side of the apparatus).

It will also be observed that the bases of the reflectors of both systems are arranged on their respective chains diagonally, that is to say, a line passing through the opposite corners of the bases of the reflectors of each set of reflectors is parallel to the direction of the longitudinal travel of the reflectors.

Figure 2:
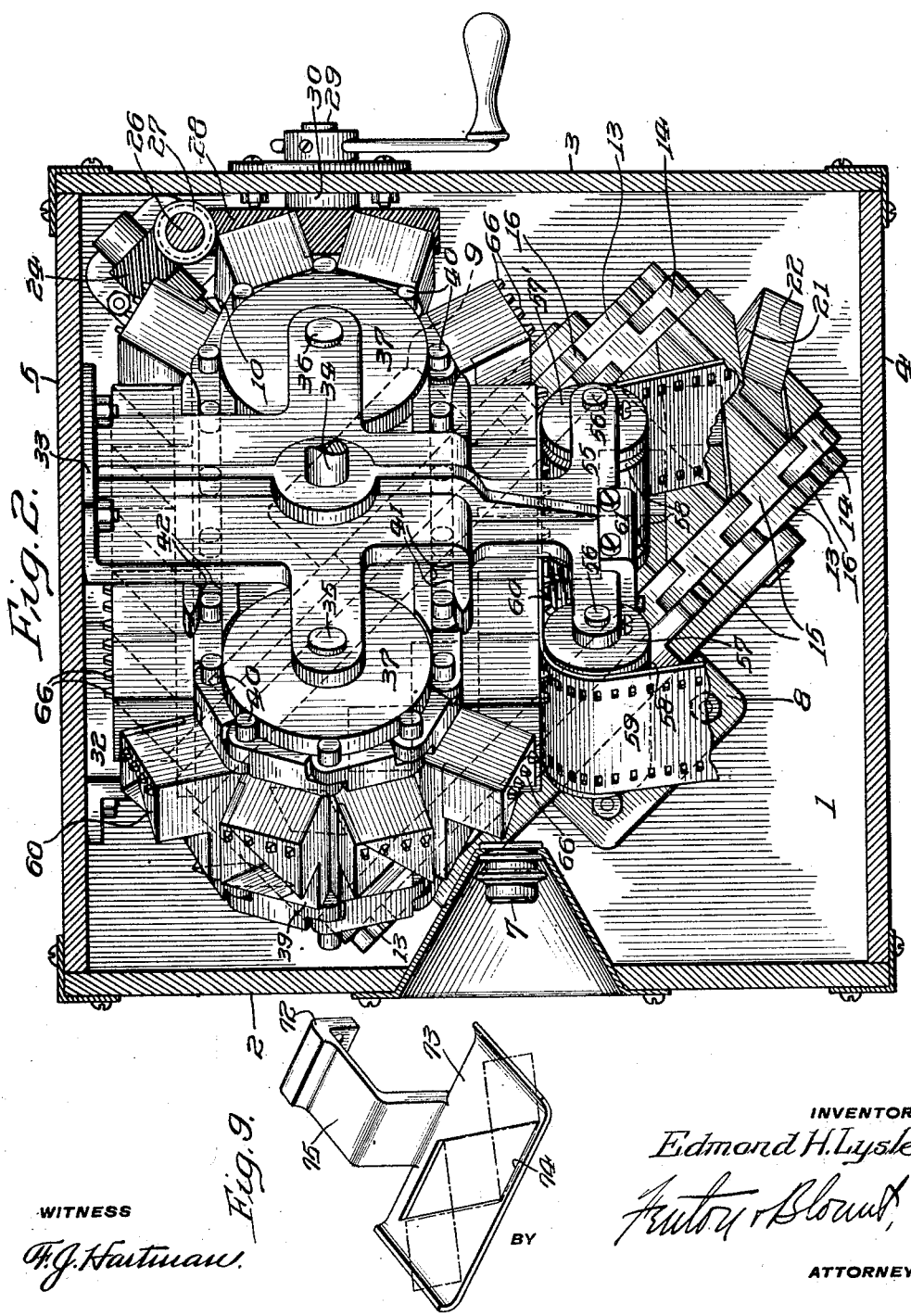
Fig. 2 is a similar plan view of the mechanism within the casing.

The upper bracket 33 is preferably provided with an extension 55 forming a supplemental bracket within which are mounted two parallel shafts 56, 56 upon which are mounted two film guide rollers 57, 57', each free to turn on its respective shaft, said rollers being preferably provided with a circumferential groove 58, said rollers 57, 57' being adapted to press a film 59 against the flat surfaces 60 of the upper chain of reflectors 45, the film 59 lying against said flat surface 60 and extending in the direction of the motion of the upper chain of reflectors during the active course of their travel as clearly illustrated in Figs. 1, 2 and 3. Said extension or supplemental bracket 55 is also provided with a downwardly extending portion 61 through which freely pass two guide pins 62, 62 carrying at their inner ends a presser plate 63 yieldingly held against the back of the film by a coil spring 64, surrounding a screw 65, having its threaded end securely screwed into the presser plate 63 and having its headed end passing freely through the downwardly extending portion 61 of the supplemental bracket 55 and preferably located midway between the guide pins 62.

The flat surfaces 60 of the reflectors 45 of the upper chain are preferably provided with one or more teeth 66 forming a rack on the said surfaces 60 during the active course of the travel of the upper reflectors, said teeth 66 being adapted to register with suitable holes or perforations 67 along one of the edges of the film 59. To permit the teeth 66 to pass by the rollers 57, 57' without interference, the grooves 58 are provided in the rollers 57, 57' as above described. The film 59 may be conducted to the upper rollers 57 through a suitable opening (not shown) in the side 4 of the casing around or over a guide roller 68 mounted in suitable brackets 69, 69 upon the side 4 and may be conducted away from the lower roller 57' over a suitable guide roller 70 mounted in brackets 71 (similar to the brackets 69, 69, see Fig. 3), through a suitable opening (not shown) in the side 4 of the casing.

It is, of course, understood that the openings for the film through the casing of the apparatus communicate with the usual retorts (not shown) from which the unexposed film may be taken and in which the exposed film may be unwound. In operating the device, a film is threaded through the apertures in the side of the casing over the rollers 68, 57, 57' and 70, the handle or crank 31 is turned and the cap is removed from the lens system.

Figure 7:
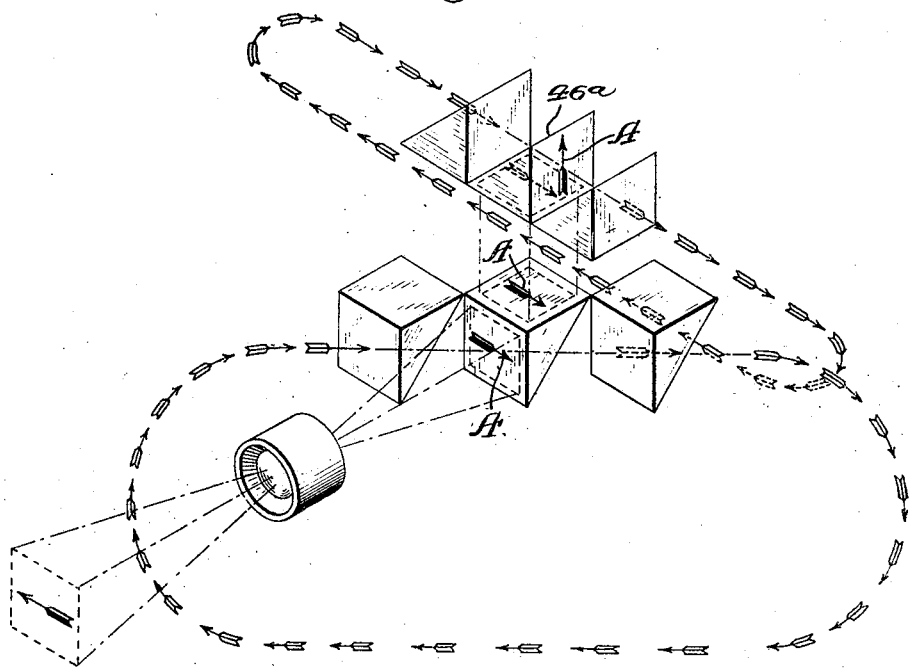
Fig. 7 is a diagrammatic view showing the manner in which the light travels through the apparatus and the directions of the travels of the reflectors during the operation of the apparatus.

Referring to Fig. 7 in which reflecting prisms are illustrated as distinguished from reflecting surfaces, particularly for the purpose of showing the manner in which the light passes from the lens to the reflectors and thence to the film, it is to be observed that during the active portion of their travel the centers of the coacting reflectors of the upper and lower series are always located in the same vertical plane with respect to each other; and that the distance from the center of a reflecting surface of the upper series is always at a constant distance from the center of the lens when measured from the center of the reflector of the upper series to the center of the coacting reflector of the lower series and thence to the center of the lens. It therefore follows that the image A which is in the plane of the sensitized surface of the film is always at a fixed distance from the center of the lens while the reflecting surface 46ª is in the reflected field of illumination of the lens (see Fig. 7).

Figure 8:
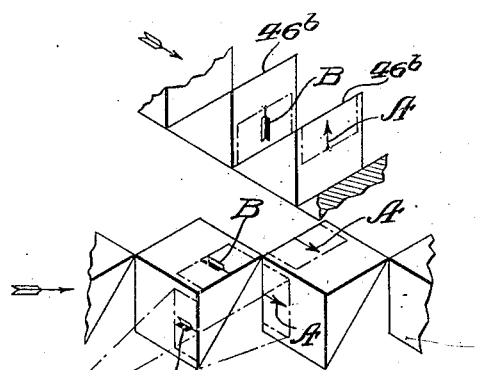
Fig. 8 is a similar diagrammatic view showing the reflectors in a different position with respect to each other from that shown in Fig. 7 and indicating the manner in which the image appears on the upper chain of reflectors and in the plane of the film.

As the reflectors continue their progression they will attain a position shown in Fig. 8, the reflecting surface 46ª having traveled one-half of its course through the field of illumination of the lens and the reflecting surface 46ᵇ having been brought into one-half of the field of illumination of the lens. Only one-half of the image A will now appear in the illuminated portion of the film pressed against the first of said reflecting prisms and the complemental half of the image B of the succeeding reflector will appear on the illuminated portion of the film pressed against the said second reflecting prism.

Similarly, referring to the lower course of reflectors, the half of the image will be reflected by one of the lower series of reflectors and the other half will be reflected upwardly by the succeeding reflecting surface.

It will be further observed that except when a pair of prisms are in exact alinement with the axis of the lens, as shown in Fig. 7, complemental portions of the image will be simultaneously reflected to two adjacent illuminated portions of the sensitized film and that during the exposure of any selected portion of the film, the field of light or illumination will appear first to be at the lower edge of the exposed portion, will sweep upwardly until the whole portion is illuminated and then will appear to pass off at the upper edge of the said exposed portion. The image, however, will be maintained stationary on the said exposed portion except for such movement as the object being photographed may have. Looked at from another point of view, the image B, referring to Fig. 8, is progressively substituted on the film and in the adjacent exposed portion for the image A of the preceding and adjacent exposed portion of the film and the pictures of the film will appear in a regular order but with their horizontal lines disposed at an angle of 45° to the line of travel of the film. The movement of the film with the upper series of reflectors substitutes one picture for another in the pathway of the lens without any relative movement between the film and the reflecting medium.

The lower and the upper reflector of a pair of coacting reflectors have respectively different functions. The lower reflector regulates or controls the time or period of exposure. The photographic medium is never in the direct field of the lens system; it is in the plane parallel to the axis of the lens system. The lens is always open, but the light permitted to pass through the lens never strikes the photographic medium except while a reflector is passing through the field and reflecting the light to the photographic medium.

The second reflector together with the film moving with it, operates to limit the exposure to a certain definite portion of the moving film.

The maintenance of a fixed focal distance from the optical center of the lens to the photographic medium while the medium is passing through the field of illumination of the lens is effected by the general disposition of the upper and lower reflectors to each other and to the film, and by the speed of travel and the directions of the paths of travel of the reflecting media and film respectively, with relation to the axis of the lens system.

The action of the plurality of lower reflectors or lower set of reflectors is substantially the same as that above described with respect to one reflector; except that their action is successive and they operate to produce successive positions of an object in motion. The action of the plurality of upper reflectors, that is to say, the upper set of reflectors, is similar to that of a single upper reflector serving to limit the exposure of the film to successive portions of the film, those portions being stationary with respect to the film.

Generally speaking, two reflectors of each set are constantly in action, except for an instant when one set of reflectors is operating to expose one complete and fully exposed portion of the film. Except at this time, however, a portion of the light permitted to enter through the lens is reflected to and focused on one predetermined portion or area of the film, and the complemental and balance of the light permitted to enter through the lens is reflected and focused on the complemental portion of the adjacent predetermined portion of the film.

On account of the fact that the reflectors move at a constant linear rate of speed and on account of the angles which they make with each other, a pair of coacting reflectors move together and at the same rate of speed measured in a direction parallel to the axis of the lens when viewed from one point of view, and they make a transit with respect to each other when viewed from another point of view.

During the operation of the apparatus as a camera, every part of the whole field of the lens is being recorded. All of the subject-matter of the picture is being constantly photographed. When the device is being used as a projector, one whole picture is always presented to the lens. As above stated, however, when the device is being used as a camera, one portion of the subject-matter may be recorded on one portion of the film and the complemental portion of the subject-matter may be recorded on the adjacent portion of the film, and when the device is used as a projector, part of a whole picture may be presented to the lens from one portion of the film and the complemental portion of the picture may be presented to the lens from the adjacent portion of the film. But there is never a time when the projecting or recording is interrupted. It is a continuous action and the picture is being presented to the screen all the time, when the device is being used as a projector, and the scene is being recorded on the film all the time, when it is used as a camera.

When the apparatus is used as a projector, the presser plate 63 should be replaced by one similarly exemplified in Fig. 9 in which there is a rectangular opening through to permit the light from the projector to pass through the plate and through the film. The modified presser plate consists of a bracket portion 72 adapted to be bolted upon the extension 55 and carrying a presser plate 73 having an oblong opening 74 therein, the opposite sides of which are parallel. In order that the presser plate 73 may be yieldingly held against the back of the film, the portion 75 thereof may be made of sufficient resiliency to hold the film yieldingly against the surface of the upper chain of reflectors and allow the film to slide smoothly thereunder. If desired, however, the presser plate 73 may be mounted similarly to the presser plate, the bracket 61 being made wider and provided with an opening corresponding to the opening 74 in the presser plate.

With the parts arranged and disposed in the manner above described, the film will have a continuous motion and will bring consecutive portions thereof into the field of illumination of the lens system and a fixed focal distance is maintained between the optical center of the lens system and the portion of the film which is in the field of illumination of said lens as reflected by said reflectors to said film. The synchronous movement of the series of reflectors and the film, coupled with the fact that the reflectors make the same angle with the principal axis of the lens in their course of travel and are disposed in planes making the same angle with respect to each other holds the field of illumination stationary on the exposed portion of the film, that is to say, by reason of the uniform speed at which the sets of reflectors and the film are driven, and the angles that they make with each other and with the principal axis of the lens a fixed and stationary optical relationship is maintained between the optical center of the lens system and the plane of that portion of the photographic medium which is in the reflected field of illumination of the lens.

Having thus described my invention, what I claim and desire to protect by Letters Patent of the United States is:

1. In an optical apparatus, the combination of a fixed lens system, a series of reflectors, means to move said series continuously transversely to and through the principal axis of said lens system, each reflector as it passes through the field of illumination of said lens system being arranged to reflect the light received therefrom at right angles to the principal axis of said lens, a second series of reflectors, means to continuously move said second series transversely to and through the light reflected from said first series of reflectors and in the same direction with respect to the axis of said lens system as that of the said first series, each reflector as it passes through said reflected field of illumination being arranged to reflect the light at right angles to the direction of the light between said reflectors, a photographic medium and means to continuously move said medium at the same speed as that of said second series of reflectors and to maintain said medium in a single plane while passing through the field of illumination as reflected from said second series of reflectors.

2. In an optical apparatus, the combination with a fixed lens system, of a series of reflectors, means to move said reflectors continuously transversely to and through the principal axis of said lens system, the line of travel being at an angle of 45° to the principal axis of said lens system, each reflector as it passes through the field of illumination of said lens system being arranged to intercept and reflect the light received therefrom at right angles to the principal axis of said lens, a second series of reflectors, means to bring said second series continuously transversely to and through the axis of said lens system, as reflected from said first series, the line of travel of said second series being at an angle of 45° to said reflected axis of said lens system, each reflector as it passes through said reflected field of illumination being arranged to reflect the light at right angles to the direction of said reflected axis and at right angles to a plane in which lies the principal axis of said lens and the said reflected axis, a film, and means to move said film through the field of illumination of said lens system as reflected from said second series of reflectors, parallel to the direction of said second series of reflectors and maintained in a single plane while passing through said reflected field of illumination, the linear speed of travel of both said series of reflectors and of said film being the same.

3. In an optical apparatus, the combination of a fixed lens system, a series of reflectors, means to cause said reflectors to move in a line passing through the principal axis of said lens system at an angle of 45° thereto and in a relatively horizontal plane, a second series of reflectors, means to continuously cause said reflectors to move in a line passing through the principal axis of said lens at an angle of 45° thereto and in a relatively vertical plane, a film disposed in a vertical plane, and means to move said film synchronously with said second series of reflectors and parallel thereto, the series of reflectors of said first system being arranged to reflect light vertically in passing through the field of illumination of said lens and the reflectors in said second series being arranged to reflect light received from said first series of reflectors horizontally in a direction normal to the plane of said film, said first and second series of reflectors moving at the same linear rate of speed.

4. In an optical apparatus, the combination of a fixed lens, a series of reflectors, means to cause said reflectors to continuously move in a line passing through the principal axis of said lens at an angle of 45° thereto and in a relatively horizontal plane, a second series of reflectors, means to cause said second series of reflectors to move continuously and synchronously with said first series in a line passing through the principal axis of said lens at an angle of 45° thereto and in a relatively vertical plane, the reflectors of said first series being disposed to reflect the light from said lens vertically and the reflectors of said second series being disposed to reflect the light from said first series horizontally and at right angles to the principal axis of said lens, and means unitary with said second series of reflectors to move a film at the same linear rate of speed as that of said second series of reflectors, with the film disposed in a substantially vertical plane.

5. In an optical apparatus, the combination with a fixed lens system, a photographic medium, a pair of reflectors, means to move said reflectors through the fixed axis of said lens system to reflect the light received from said lens system at an angle of 90° to the principal axis of said lens system, a second pair of reflectors, means to move said second pair of reflectors through the axis of said lens system as reflected from said first reflectors to reflect the light received from said first reflectors at an angle of 90° and in a plane at right angles to the principal axis of said lens system and means to move said photographic medium parallel to the direction of the motion of said second pair of reflectors with the film disposed in a plane normal to the direction of the light reflected from said second pair of reflectors, the motion of said reflectors and said film being synchronous.

6. In an optical apparatus, the combination with a fixed lens system, a photographic medium, a pair of reflectors arranged to reflect light from said lens system at an angle of 90° to the principal axis of said lens, a second pair of reflectors arranged to reflect light received from said first pair of reflectors, in a plane disposed at an angle of 90° to the principal axis of said lens system and at 90° from the principal axis of said reflected axis, a photographic medium disposed in a plane normal to the principal axis of said lens as reflected from said second pair of reflectors and means to cause said reflectors and said medium to travel synchronously, the paths of said reflectors being through the principal axis of said lens system and at an angle of 45° thereto and in planes disposed at an angle of 45° to each other.

7. In an optical apparatus, the combination with a continuously open lens, of two sets of coacting reflectors, the central lines of which are arranged in planes perpendicular to each other and in which planes also lies the axis of said lens, means to move said sets continuously and synchronously in said planes to reflect different portions of the field of illumination of said lens into different adjacent positions in the same plane of focus, a photographic medium arranged in a plane parallel to the axis of said lens, and means to continuously move said medium in said plane of focus and to maintain an optical stationary relationship between said film and the light as reflected thereto from said second set of reflectors.

8. In an optical apparatus, the combination of a fixed lens system, two series of reflectors, means to move said reflectors continuously transverse to and through the principal axis of said lens system and in planes making the same angle with each other that said reflectors make with said principal axis, said series of reflectors moving in the same general direction with respect to the optical center of said lens system and at the same speed, a film disposed in a plane parallel to the axis of said lens system and normal to the axis of said lens system as reflected from the second of said series of reflectors and means to move said film in said last mentioned plane by and with said second series of reflectors.

9. In an optical apparatus, the combination of a fixed lens system, a moving series of reflectors arranged to travel through the principal axis of said lens at an angle thereto and to reflect light at right angles to the principal axis of said lens, a second series of reflectors arranged to travel in a plane coincident with the axis of said lens system and to receive the light reflected from said first series of reflectors and reflect it at right angles and in a direction normal to a plane passing through the principal axis of said lens, a photographic medium and means to move said medium with said second series of reflectors, said medium being disposed in a plane normal to the path of light reflected from said second series of reflectors.

10. In an optical apparatus, the combination of a continuously open lens system, means to produce an animated virtual image of an object in motion, a photographic medium, means to constantly move said medium with the plane of said medium parallel to the principal axis of said lens system and means uniformly and linearly movable in planes parallel to said axis to reflect said animated virtual image to said medium and to hold it in focus in the plane of said medium and in a relatively fixed and predetermined position on said moving medium.

11. In an optical apparatus, the combination of a continuously open lens system, means to produce an animated virtual image of an object in motion, a film, means to constantly move said film with the plane of said film parallel to the principal axis of said lens system, means uniformly and linearly movable in planes parallel to said axis to reflect said animated virtual image to said film and to hold it in focus in the plane of said film and in a relatively fixed and predetermined position on said moving film.

12. In an optical apparatus, the combination of a continuously open lens system, means to produce an animated virtual image of an object in motion, a film, means to continuously move said film with the plane of said film vertical and parallel to the principal axis of said lens system, and means uniformly and linearly movable in planes parallel to said axis to reflect said animated virtual image to said film and to hold it in focus in the plane of said film and in a relatively fixed and predetermined position on said moving film.

In witness whereof, I have hereunto set my hand this 20th day of April, 1916.

EDMOND H. LYSLE.